United States Patent [19]

Stafford

[11] 3,811,039

[45] May 14, 1974

[54] BINARY ARITHMETIC, LOGICAL AND SHIFTER UNIT

[75] Inventor: John P. Stafford, Oklahoma City, Okla.

[73] Assignee: Honeywell Information Systems, Inc., Waltham, Mass.

[22] Filed: Feb. 5, 1973

[21] Appl. No.: 329,489

[52] U.S. Cl. .............................................. 235/175
[51] Int. Cl. .............................................. G06c 7/50
[58] Field of Search ...................... 235/175, 174, 173

[56] References Cited

UNITED STATES PATENTS

| | | | |
|---|---|---|---|
| 3,417,236 | 12/1968 | Utley | 235/175 |
| 3,588,483 | 6/1971 | Lesniewski | 235/175 |
| 3,711,693 | 1/1973 | Dahl | 235/174 |
| 3,752,394 | 8/1973 | Igel | 235/174 |

*Primary Examiner*—Malcolm A. Morrison
*Assistant Examiner*—David H. Malzahn
*Attorney, Agent, or Firm*—J. A. Pershon; G. R. Woods

[57] ABSTRACT

The arithmetic logic unit and position scaler receives information from a data bus, provides arithmetic functions such as add, logical AND and exclusive OR, and shift manipulations to the information received from the data bus, and then directs the resultant information to the same data bus. The information bit position scaler or shifter includes logic for shifting bit information in a right, left or circular mode. The position scaler provides layers of shifts with the last shift of one being performed in a multiplexer unit which is common to the arithmetic logic unit.

15 Claims, 6 Drawing Figures

| | R | L | N1 | N2 | N3 | OPER. | OUTPUT DATA BITS B1 | B2 | B3 | B4 | B5 | B6 | B7 | B8 |
|---|---|---|---|---|---|---|---|---|---|---|---|---|---|---|
| SHIFT RIGHT | 1 | 0 | 0 | 0 | 0 | R0 | B1 | B2 | B3 | B4 | B5 | B6 | B7 | B8 |
| | 1 | 0 | 0 | 0 | 1 | R1 | — | B1 | B2 | B3 | B4 | B5 | B6 | B7 |
| | 1 | 0 | 0 | 1 | 0 | R2 | — | — | B1 | B2 | B3 | B4 | B5 | B6 |
| | 1 | 0 | 0 | 1 | 1 | R3 | — | — | — | B1 | B2 | B3 | B4 | B5 |
| | 1 | 0 | 1 | 0 | 0 | R4 | — | — | — | — | B1 | B2 | B3 | B4 |
| | 1 | 0 | 1 | 0 | 1 | R5 | — | — | — | — | — | B1 | B2 | B3 |
| | 1 | 0 | 1 | 1 | 0 | R6 | — | — | — | — | — | — | B1 | B2 |
| | 1 | 0 | 1 | 1 | 1 | R7 | — | — | — | — | — | — | — | B1 |
| CIRCULAR MODE | 1 | 1 | 0 | 0 | 0 | R0,L0 | B1 | B2 | B3 | B4 | B5 | B6 | B7 | B8 |
| | 1 | 1 | 0 | 0 | 1 | R1,L7 | B8 | B1 | B2 | B3 | B4 | B5 | B6 | B7 |
| | 1 | 1 | 0 | 1 | 0 | R2,L6 | B7 | B8 | B1 | B2 | B3 | B4 | B5 | B6 |
| | 1 | 1 | 0 | 1 | 1 | R3,L5 | B6 | B7 | B8 | B1 | B2 | B3 | B4 | B5 |
| | 1 | 1 | 1 | 0 | 0 | R4,L4 | B5 | B6 | B7 | B8 | B1 | B2 | B3 | B4 |
| | 1 | 1 | 1 | 0 | 1 | R5,L3 | B4 | B5 | B6 | B7 | B8 | B1 | B2 | B3 |
| | 1 | 1 | 1 | 1 | 0 | R6,L2 | B3 | B4 | B5 | B6 | B7 | B8 | B1 | B2 |
| | 1 | 1 | 1 | 1 | 1 | R7,L1 | B2 | B3 | B4 | B5 | B6 | B7 | B8 | B1 |
| SHIFT LEFT | 0 | 1 | 0 | 0 | 0 | L0 | — | — | — | — | — | — | — | — |
| | 0 | 1 | 0 | 0 | 1 | L7 | B8 | — | — | — | — | — | — | — |
| | 0 | 1 | 0 | 1 | 0 | L6 | B7 | B8 | — | — | — | — | — | — |
| | 0 | 1 | 0 | 1 | 1 | L5 | B6 | B7 | B8 | — | — | — | — | — |
| | 0 | 1 | 1 | 0 | 0 | L4 | B5 | B6 | B7 | B8 | — | — | — | — |
| | 0 | 1 | 1 | 0 | 1 | L3 | B4 | B5 | B6 | B7 | B8 | — | — | — |
| | 0 | 1 | 1 | 1 | 0 | L2 | B3 | B4 | B5 | B6 | B7 | B8 | — | — |
| | 0 | 1 | 1 | 1 | 1 | L1 | B2 | B3 | B4 | B5 | B6 | B7 | B8 | — |

BINARY ARITHMETIC, LOGICAL AND SHIFTER UNIT

BACKGROUND OF THE INVENTION

This invention relates generally to a calculating unit and more specifically to a simplified binary arithmetic system combining a position scaler with an arithmetic and logical unit.

1. Field of the Invention

In present-day accounting machine or point of sale terminals, the terminals themselves must perform most of the calculations even though the terminals may operate remotely with a central processing system. These terminals must be capable of performing most of the simple arithmetic and logical operations formerly performed by complex mechanical machinery or through two-way communication with the central processing system.

Most of the terminals are located in limited size areas such as in a small office or on a sales floor and thus the terminals along with their calculating units must be compact units. Present-day trends are to include separate functions on particular integrated circuit chips. Each integrated circuit chip performed a certain function such as registers, full adders, or a particular arithmetic or logical function. Providing an improved position scaler or shifting logical circuitry for inclusion with a simplified arithmetic and logical unit is the field of this invention.

2. Description of the Prior Art

The prior art arithmetic and logical units performed the arithmetic, logical and shifting functions in separate units. The interconnection of the functions proved to be extremely complicated and required a duplication of logic circuitry. Particularly, the shifting function required complex logical circuitry to provide a bidirectional circular position shifter.

Further, former arithmetic and logical units required complex circuitry and storage units to obtain the proper resultant. Separate bus interconnections had to be provided for the input lines and the output lines to prevent bit interference.

SUMMARY OF THE INVENTION

The position scaler and the arithmetic and logical unit ALU/SHIFTER combination according to the present invention receives commands directing the operation to be performed. Under control of the arithmetic and logical commands, a set of binary input data information is gated into the unit from a data bus into an input register, transferred to an output register via a full adder unit under control of a logic arithmetic gating unit operating according to the commands. The output register information is directed to the arithmetic gating unit for commands requiring the combining of two sets of information via the full adder unit. The resultant is gated via a multiplexer to the same data bus from which the input information is obtained. Under control of the position scaling commands, the binary input data information is selectively gated into a highest number of shifts unit. The direction commands control only the highest number of shifts unit. The data information is directed, and shifted if required by the commands, from the highest number of shifts unit to the next highest number of shifts unit. The lowest number of shifts unit, a shift by one unit, is combined in the multiplexer unit with the arithmetic and logical resultant. A register shift output unit stores the information ready for gating to the multiplexer.

For flexibility of use of the ALU/SHIFTER combination according to the present invention and the preferred embodiment, the ALU/SHIFTER is divided into two identical sections, each controlling one-half of the bit information signals. The carry in and/or carry out signals as well as the position scaler section include special signals and logic gating to distinguish the most significant half section from the least significant half section. The shift by one formation of the position scaler or shift section is combined with the output gating from the arithmetic section to decrease the number of logic gates and the number of levels of logic gating required in the system.

It is, therefore, an object of the present invention to provide an enhanced arithmetic, logical and position scaler combination system.

It is another object of the present invention to provide an arithmetic, logical and position scaler combination system which receives and transmits binary data information from the same data bus under control of programmable commands.

It is yet another object to provide an arithmetic, logical and position scaler combination system which combines the lowest shifting function of the position scaler with the output gating from the arithmetic and logical function.

It is still another object to provide an arithmetic, logical and position scaler combination system which provides logical gating that decreases the logic functions required to perform the desired arithmetic and logical operations.

These and other objects of the present invention will become apparent to those skilled in the art as the description of a preferred embodiment proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

DESCRIPTION OF THE PREFERRED EMBODIMENT

The arithmetic and logical and shifter unit, ALU/-

Figures 1, 6:
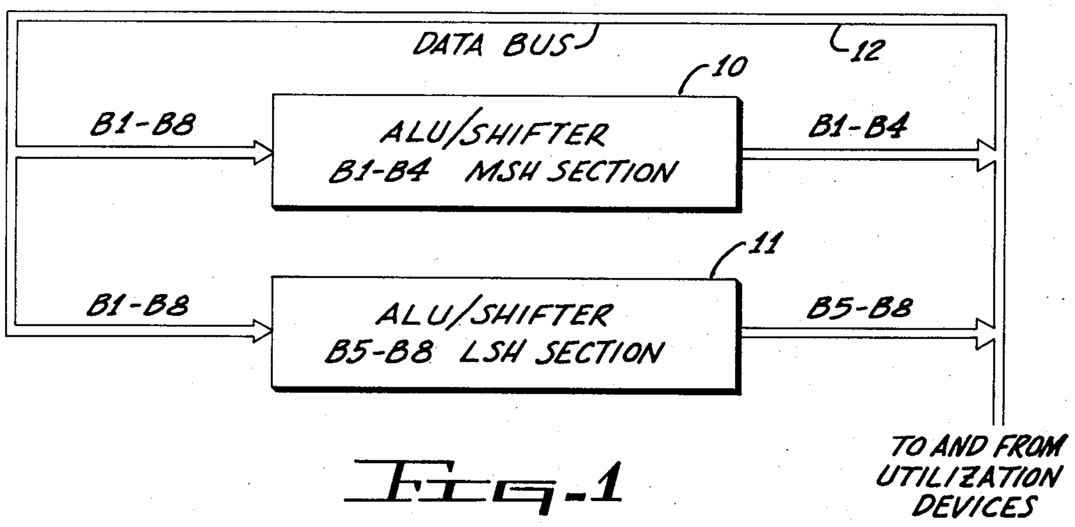
FIG. 1 is a block diagram of two units comprising an 8 bit arithmetic, logical and shifter unit connected to a data bus according to the present invention.
FIG. 6 is a truth table for an 8 bit position scaler showing the resultant bit positions after shifting according to the actuation of the shift selection and using the combined shift sections for the most significant half unit and the least significant half unit of FIG. 1.

SHIFTER, according to the preferred embodiment is a combined 8 bit arithmetic unit and 8 bit shifter. Referring to FIG. 1, the ALU/SHIFTER is divided into two 4 bit sections, an MSH section 10 and an LSH section 11. Each unit receives all 8 bit information signals, B1–B8 from a data bus 12. In the present embodiment, the B1 bit information signal from the data bus is designated the most significant digit. The first ALU/-SHIFTER section 10 controls the most significant data bits B1–B4 and directs these bits to the data bus 12. The second ALU/SHIFTER section 11 controls the least significant data bits B5-B8 and directs these bits to the data bus. As shown in FIG. 1, the same data bus directs the data information to and from the ALU/-SHIFTER units.

Each of the ALU/SHIFTER units 10 and 11 is identical. The logical circuitry in each unit is designed such that the logical units can be used alone for a 4 bit unit or used in combination for an 8 bit unit. Since the units are identical, a discussion of the circuitry in both is not believed to be necessary. Therefore, in FIGS. 2, 3, 4 and 5 only one unit is shown. The control circuit is the same for both units. The only difference is the connection to and from the data bus. The first or most significant half unit will be described in the following figures. The data bus connections for the second unit are shown in parenthesis on the data bus signal connections.

Figure 2:
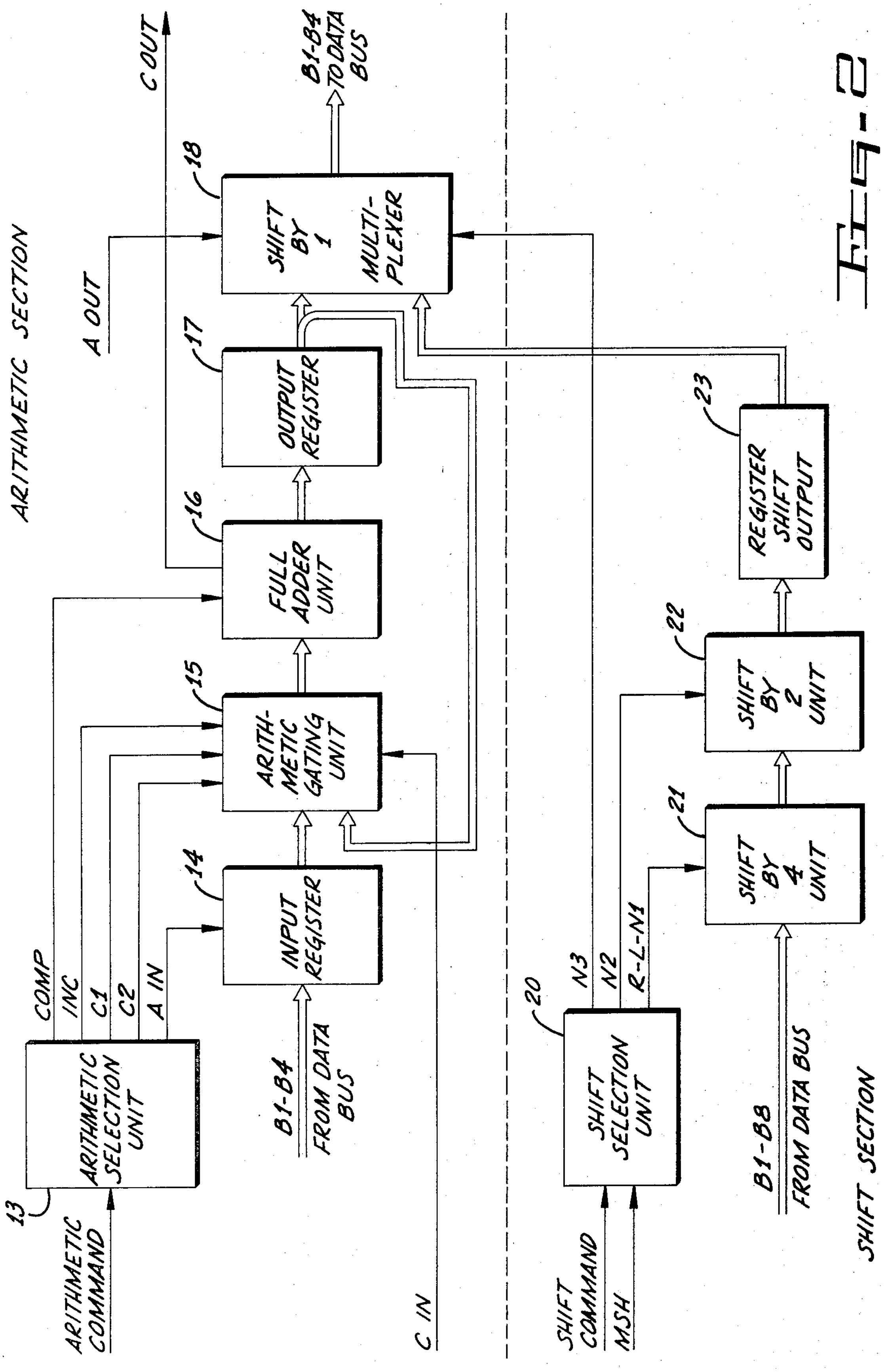
FIG. 2 is a block diagram of the most significant half unit of the arithmetic, logical and shifter unit shown in FIG. 1.

Referring now to FIG. 2, a block diagram of the first arithmetic logic unit and shifter is shown. The ALU/-SHIFTER comprises an arithmetic section and a shifting section with the output combined in a multiplexer 18. The multiplexer 18 provides a shift by one and also derives the data bus information signals, B1–B4, for connection to the data bus. The arithmetic section includes an arithmetic selection unit 13, an input register 14, arithmetic gating unit 15, a full adder unit 16, and an output register 17.

The shift section includes a shift selection unit 20, a shift by four unit 21, a shift by two unit 22, and a register shift output 23. As stated, the shift by one is provided in the multiplexer 18 unit.

The arithmetic selection unit 13 takes the arithmetic commands from an instruction decoding unit (not shown) and selects the arithmetic operation to be performed. The information bits from the data bus are transmitted to and stored in the input register 14 upon the activation of an allow input AIN signal directed to the input register 14 from the arithmetic selection unit 13. At the same time, the arithmetic selection unit 13 selects the correct arithmetic gating controls to perform the required function. For instance, in an add instruction, the C1 and C2 signals shown at the output are enabled. The COMP signal is enabled if a complement of the number is desired and the INC signal is enabled if an increment by 1 is desired. The INC signal is permanently placed in a low state on the most significant half section if both 4 bit sections are used to make an 8 bit unit. The INC signal adds "1" to the least significant digit only. If the C1 and C2 signals are both disabled, a logical AND function will be performed by the arithmetic section. If only the C2 signal is enabled, an exclusive OR logical function will be performed. The C1 signal only enables the carry signal COUT. General operation of the arithmetic section on an add function is to gate the first data information from the data bus into the input register 14 on the first clock timing pulse. The first information is then transmitted to the output register 17 and the information to be added to the first data information is gated into the input register 14. The information in the two registers is then combined via the full adder unit 16 and the result is placed into the output register 17. Logic is provided for a full carry look ahead including a carry out signal for overflow or carry in to the higher or more significant digits.

The shift section is capable of shifting in a bidirectional mode either right or left by performing selected shifts with zero fill or in a circular mode. The shift section according to the preferred embodiment can shift 8 bits of information a maximum of 7 shifts by selectively activating the shift by four unit 21, the shift by two unit 22, and the shift by one capability of the multiplexer 18. A shift command from the instruction decode (not shown) activates the shift selection unit 20 according to the required shifting instructions. The shift selection unit 20 activates any one or all of the three shifting units via a shift selection signal, a N1 signal for the shift by four unit 21, a N2 signal for the shift by two unit 22, and a N3 signal for the shift by one section of the multiplexer 18. The data information bits B1–B8 from the data bus are transmitted into the shift by four unit 21 first and transmitted through the shift by four unit 21 into the shift by two unit 22 and then into the register shift output 23. The path is taken whether the shift by four or the shift by two unit is activated or not. The direction signals, right or left (R and L), control only the shift by four unit 21. If a right or left shift is required either the R or L signal is activated. For a circular mode both the right and the left direction signals are activated. Since the first 4 bits of information B1–B4 are designated the most significant digits, the MSH signal is activated and controls the shift selection unit 20.

The shifted data information in the register shift output 23 is directed to the shift by one section of the multiplexer 18. The shift by one section of the multiplexer 18 is activated by the shift selection signal N3. The multiplexer 18 will perform a shift by one operation if activated by the N3 signal. If there is no shift by one required, the multiplexer 18 will transmit the data information from the register shift output 23 without change to the data bus. The information stored in the multiplexer 18 either from the shift section or from the arithmetic section is transmitted to the data bus upon the activation of an allow output AOUT signal from the instruction decode.

Figure 3:
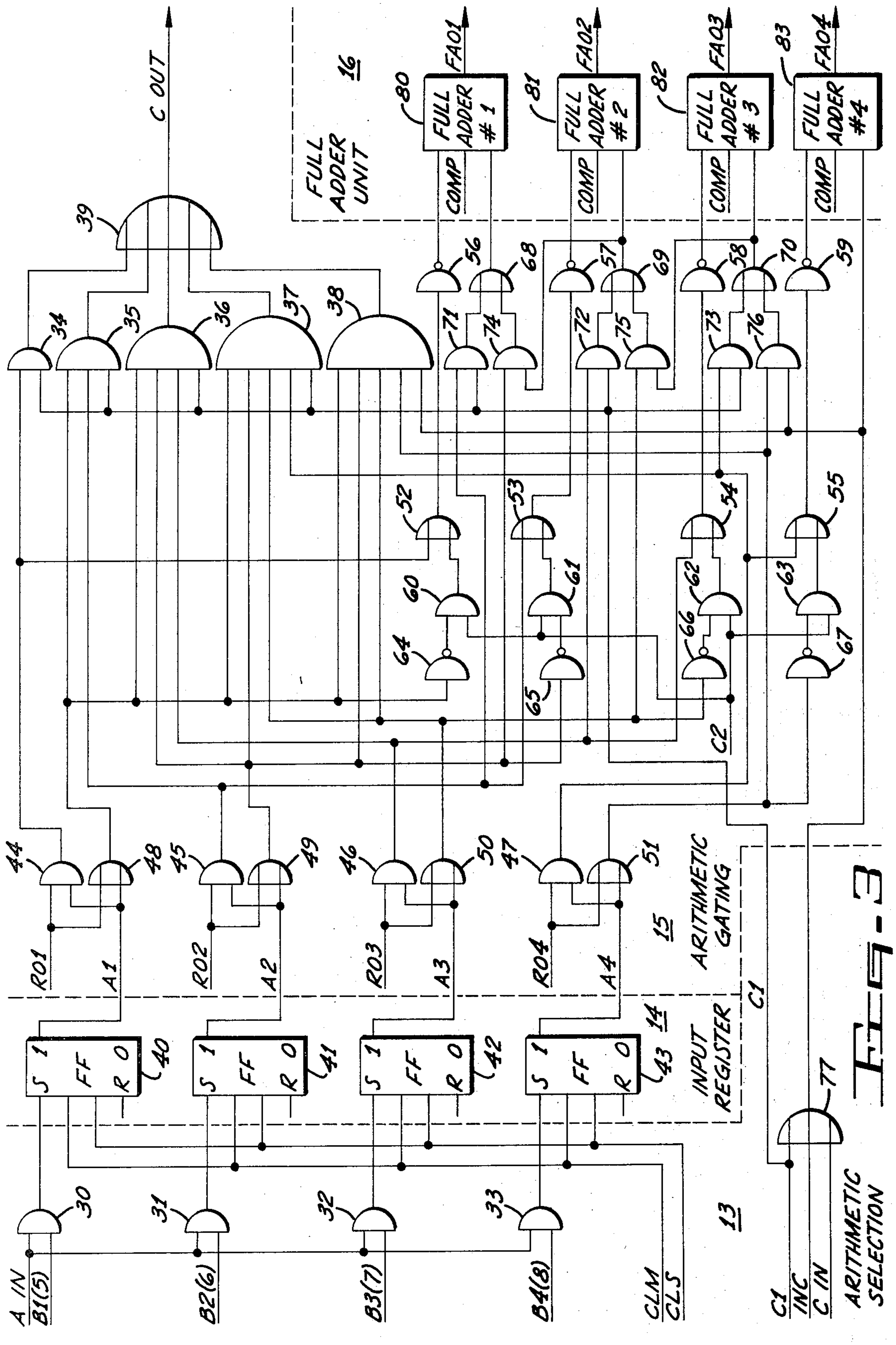
FIGS. 3 and 4 are a logic diagram divided into blocks showing logic circuitry of the arithmetic and logical section according to FIG. 2.
Figure 4:
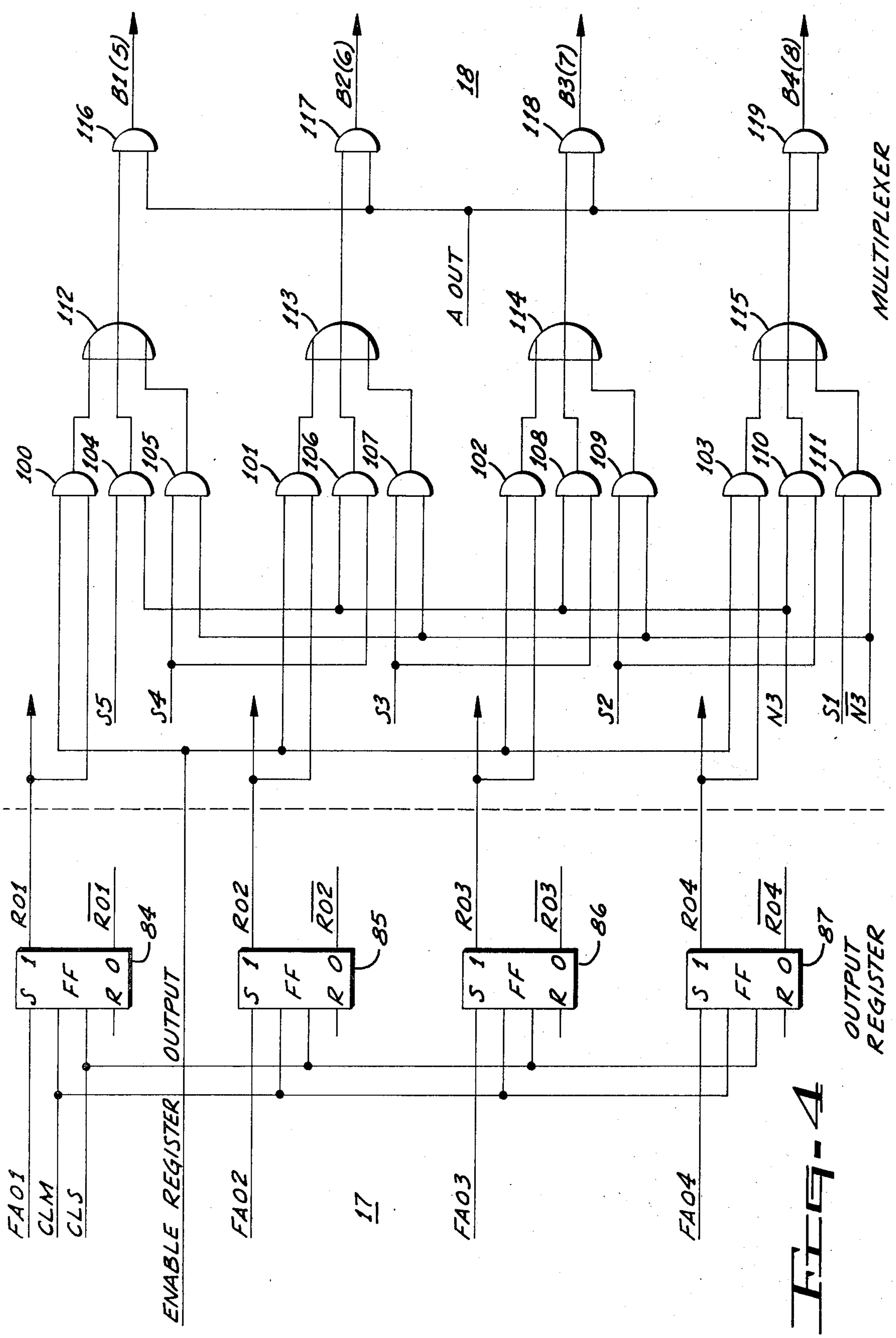
Figure 5:
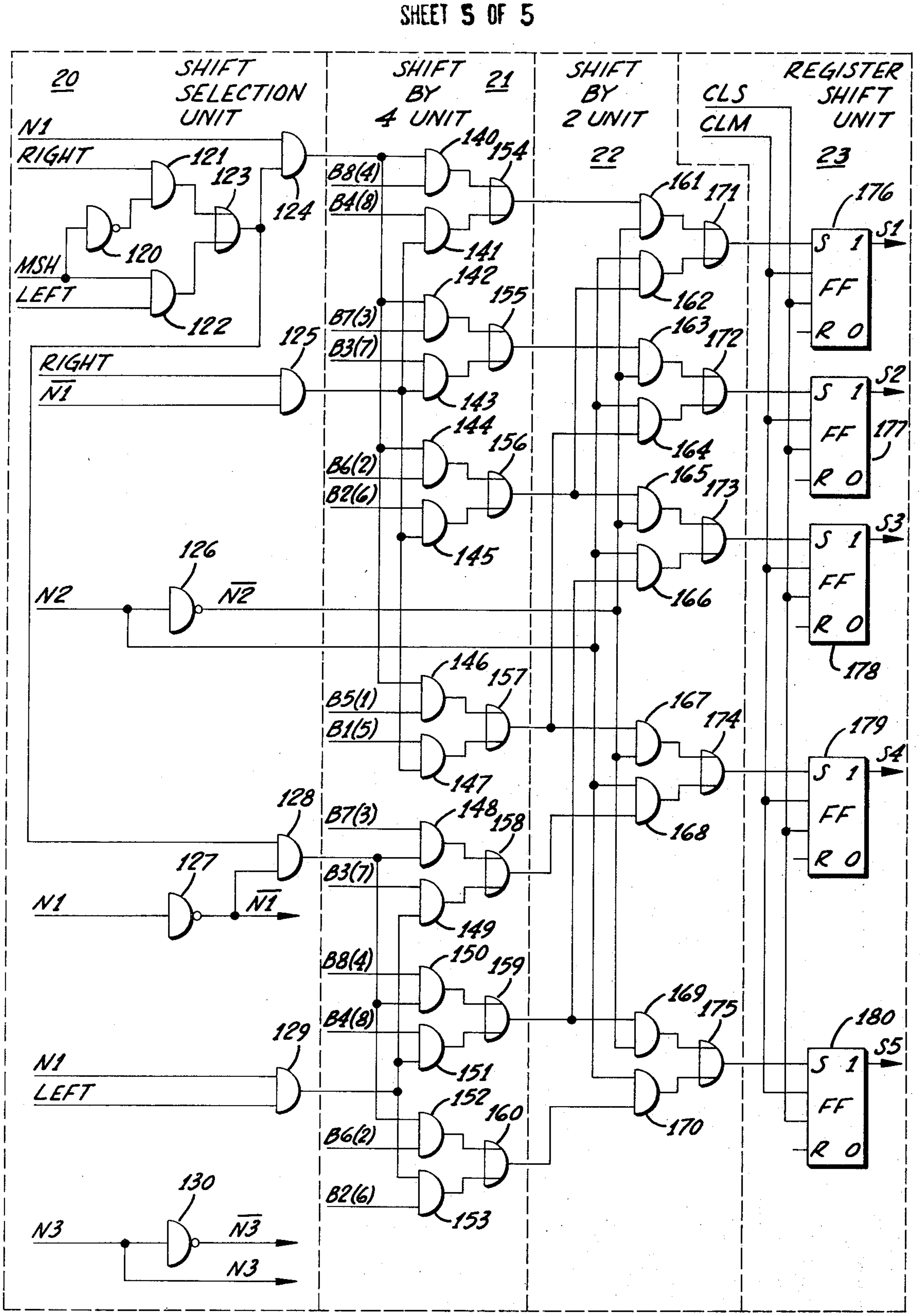
FIG. 5 is a logic diagram divided into blocks showing the logic circuitry of the units of the shift section according to FIG. 2.

The particular logic configuration for the most significant half of the ALU/SHIFTER shown in FIG. 2 is shown in FIGS. 3, 4 and 5. The logic configuration for the arithmetic selection unit 13, the input register 14, the arithmetic gating unit 15, and the full adder unit 16 is shown in FIG. 3. The logic configuration for the output register 17 and the multiplexer 18 is shown in FIG. 4. The logic configuration for the shift section and comprising the shift selection unit 20, the shift by four unit 21, the shift by two unit 22, and the register shift output 23 is shown in FIG. 5. A truth table for the shift section for use with the 8 bits of information according to the preferred embodiment is shown in FIG. 6.

Only blocks representing the full adders No. 1 to No. 4 are shown in FIG. 3 since these are standard units readily available. A full description of a full adder is not believed to be required herein. Basically the full adders in the present embodiment provide an enabled output if an odd number of the three inputs to the adder are enabled.

The logic components utilized in the different components can be discrete component logic circuitry or of the integrated circuit variety. Positive logic circuitry such as AND-gates and OR-gates are used in the description of the preferred embodiment. It is obvious however that by changing the signal levels, negative and positive logic circuitry can be interchanged without departing from the scope of this invention. As is well known, positive logic circuitry requires a high signal to activate the circuitry and produces a high signal at the output when activated. In the disclosed embodiment a binary "1" signal is referred to as a high or enabling signal and a binary "0" is referred to as a low or disabled signal. A set of data information bit signals is the eight data bus information signals, B1–B8.

The AND-gate modules disclosed in the figures provide the logical operation of conjunction for binary "1" or high or positive signals applied thereto. A high level signal appears at the output of the AND-gate when, and only when, all of the input signals applied thereto are in their high state. AND-gates 44 and 45 in FIG. 3 are representative of the AND-gates described.

The OR-gate modules disclosed in the drawings provide the logical operation of inclusive OR for binary "1" or high or positive input signals applied thereto. A high signal appears at the output of the OR-gate when any one or more of the input signals are in a high state. OR-gate 48 of FIG. 3 is representative of the OR-gates described.

The inverter modules disclosed in the Figures provide the logical operation of inverting the state of the signal applied to the input of the inverter. Thus a high level signal appears at the output of the inverter when a low level signal is applied to the input. A low level signal appears at the output of the inverter when the input signal is in a high state. Inverter 64 of FIG. 3 is representative of the inverters described and shown.

A group of bistable or flip-flop modules comprise the registers of the preferred embodiment. The flip-flop (FF) modules 40 and 41 are representative of those used in the system disclosed. The flip-flops shown can be standard J-K flip-flops requiring a high signal applied to both the set and clock triggering inputs of the flip-flop before the flip-flop will change from the reset stage, that is, the "0" output is high or enabled, to a set state, that is, the "1" output is high or enabled. Generally, the clock pulse triggers the change in state of the flip-flop when the clock pulse changes state upon its low to high transition.

Referring now to FIG. 3, the allow input AIN signal controls the loading of the input register 14 with the data information signals B1–B4 from the data bus. The data bus connections for the least significant section is shown in parenthesis after the data information signals. When the AIN signal is high or enabled, the information from the data bus is transferred into flip-flops 40–43 of the input register 14. The actual transfer is made when the master clock signal CLM changes state from a low to a high signal level. The input register 14 is cleared to all zeros, that is, to a reset state, if the AIN signal is low and a master clock CLM signal and slave clock CLS signal activates the flip-flops in the input register 14. The master clock CLM signal is used to synchronize the data information transfer through the basic units. The slave clock CLS signal is a delayed timing signal controlling the resetting of storage registers.

The output signals from the input register 14 are directed to a group of carry generate AND-gates 44–47 used to combine the signals stored in the input register 14 and the output register 17 and to generate a carry to the next more significant bit position. The output signals from the input register 14 are also directed to a group of carry propagate OR-gates 48–51 used to provide a signal of the inclusive ORing of the input and output register signals for propagating a carry from the next least significant bit position. The AND-gates 44–47 are directed to one leg of a group of AND-gates 34–38 comprising the carry look-ahead feature of the arithmetic and logical section. The outputs of the AND-gates 34–38 are combined in an OR-gate 39 whose output is the carry out COUT signal. The AND-gates 34–38 are actuated by different signals which, when combined in one of the AND-gates 34–38 produces a carry output COUT signal for the add operation. The COUT output signal from the unit servicing the least significant bits will become the carry in CIN input on the unit servicing the most significant digits. The COUT signal on the unit servicing the most significant digits is used to indicate a carry out or an overflow of the most significant bit of the arithmetic section.

The outputs of the AND-gates 44–47 are also directed to a group of OR gates 52–55 whose outputs are directed individually via inverters 56–59 to one of the full adders 80–83. The OR-gates 52–55 are also controlled each by AND-gates 60–63 having one leg controlled by the C2 signal. The other legs of each of the AND-gates 60–63 are controlled each by a group of inverters 64–67 whose inputs are connected to the respective carry propagate OR-gates 48–51. The outputs of the carry propagate OR-gates 48–51 are also directed to selected AND-gates 35, 36, 37 and 38 of the carry look-ahead AND-gates 34–38. The outputs of the carry propagate OR-gates 49, 50, 51 and the outputs of the carry generate AND-gates 45, 46 and 47 are also directed to a plurality of AND-gates 71–76 whose outputs are directed via OR-gates 68, 69 and 70 to one input to the full adder No. 1, the full adder No. 2, and the full adder No. 3, respectively. The second input leg of the AND-gates 71, 72 and 73 controlled by the carry generate AND-gates 45, 46 and 47 is connected to the C1 signal for activation on a carry enable function. The second leg of the AND gates 74 and 75 is activated by a carry signal from the lesser significant bit position and generated by OR-gates 69 and 70, respectively. For instance in the case of the carry AND-gate 74 applied to the full adder No. 1 via OR-gate 68, the one leg of the AND-gate 74 is controlled by the activation of the carry to the full adder No. 2 from the OR-gate 69. The corresponding input to the full adder No. 4 is activated by an OR-gate 69. The corresponding input to the full adder No. 4 is activated by an OR-gate 77 in the arithmetic selection unit 13 whose input is controlled by the C1 signal, the INC signal, and the CIN signal. This input to full adder No. 4 is activated by the carry in signal from the least significant section. The increment by one INC signal is permanently disabled on this section since the INC signal affects only the least significant digit. The carry enable C1 signal affects all possible carry logic units.

The outputs of the full adder unit 16, the FA01–FA04 signals, are directed to the set input of flip-flops 84–87 comprising the output register 17. Thus upon the occurrence of the CLM clock signal, the flip-flops 84–87 in the output register 17 will contain the information from the full adder unit 16. The output signals, R01–R04, of the output register 17 are directed to a group of AND-gates 100–103 in the multiplexer 18 and to the carry propagate OR-gates 48–51 and to the carry generate AND-gates 44–47 in the arithmetic gating unit 15 (see FIG. 3). The second leg of the group of AND-gates 100–103 in the multiplexer 18 are enabled by an enable register output signal. The enable register output signal allows the transfer of the signals from the output register 17 via a group of OR-gates 112–115 and a group of AND-gates 116–119 to the B1–B4 bits of the data bus. The actual transfer to the data bus occurs when the allow output AOUT signal is enabled thereby enabling the second leg of the AND-gates 116–119. The multiplexer 18 also includes another group of AND-gates 104–111 directed to the OR-gates 112–115. These AND-gates 104–111 are used in the shift section to provide the shift by one capability of the multiplexer 18. The connections to and the operations of the AND-gates 104–111 will be explained later in the discussion of the shift section shown in FIG. 5.

In the operation of the arithmetic and logical section and referring to FIGS. 3 and 4, the input register 14 will be cleared to all zeros upon the occurrence of a CLS clock signal provided the AIN signal is low disabling the AND-gates 30–33 connected to the input register 14. With the input register 14 cleared, the output register 17 can be cleared to all zeros on a CLS clock pulse if the control signals in the arithmetic selection unit 13 are set for an "AND" operation, that is, C1 = 0, C2 = 0, COMP = 1, INC = 0. The logical AND function of all zeros with any value is still all zeros. With the input register 14 cleared, the information stored in the output register 17 can be recirculated through the arithmetic section unchanged if the signals controlling the ALU/SHIFTER are set for either an ADD or an exclusive OR operation, that is, C1 = 1, C2 = 1, COMP = 0, INC = 0, or C1 = 0, C2 = 1, COMP = 0, INC = 0. The ADD or exclusive OR operation of all zeros with any value is that value. Thus the results of any operation can be stored in the output register 17.

When the output register 17 is cleared, the first of two operands can be transferred into the output register 17 from the input register 14. The arithmetic selection signals must be set either in the ADD or the exclusive OR operation. The first operand information can be "1's complemented" as it passes through the arithmetic gating unit 15 and the full adder unit 16 by setting the COMP signal to a high state. The second operand is then transferred into the input register 14 on the same clock signal which transfers the first operand to the output register 17. The second operand is transferred into the input register 14 from the data bus by enabling the AIN signal.

To perform a logical AND operation, the C1 and C2 signals are low, that is, C1 and C2 = 0, and the COMP signal is high, that is, COMP = 1. The A1 signal from the flip-flop 40 of the input register 14 and RO1 signal from the output register 17 are both directed to the AND-gate 44. With both the C1 and C2 signals disabled, no carry functions can be performed. Thus the signal from the output of the AND-gate 44 is directed to the inverter 56 via the OR-gate 52. Assuming that both the A1 and RO1 signals are high, that is, A1 and RO1 = 1, the output of the inverter 56 will be low applied to the full adder No. 1. The COMP signal being enabled will permit a 1 or enabled signal to be generated by the full adder No. 1 and this information will be stored in the flip-flop 84 in the output register 17. The third input to the full adder No. 1 is disabled by the low C1 and C2 signal. Thus a logical AND function is performed. A logical NAND function is performed if the COMP signal is set to a low state. The exclusive OR function can be performed by enabling the C2 signal and following the path as previously described. Likewise the ADD function can be performed by enabling the C1 and C2 signals to enable the full carry function of the arithmetic gating unit 15.

An "inclusive OR" function can be accomplished by the arithmetic section of the disclosed embodiment by multiple operations. The first operation is to complement both operands, then performing the logical AND functions on the complemented values, and then complementing the results. That is, by DeMorgan's theorem, $(A1 + RO1) = (\overline{\overline{A1}\ \overline{RO1}})$.

Referring now to FIG. 5, the logic components of the shift section of FIG. 2 is shown. The separate blocks shown in FIG. 3 are separated by dashed lines in FIG. 5. The shift selection unit 20 comprises a plurality of logic components which take the direction signals, right and left, and the shift selection signals, N1, N2 and N3, from the instruction decode and control the operation of the three shift units used in the preferred embodiment. The half section being described is the most significant half of the ALU/SHIFTER since this section controls the most significant digits, the B1–B4 information signals. Therefore, the MSH signal is enabled. The use of the MSH signal permits the use of identical logic circuitry for each half section of the position scaler section when two units are used for 8 bits of information. The MSH signal selectively activates the correct logical gates in the shift by four unit 21 to accomplish the bidirectional shift in the circular mode. The MSH signal is directed to an AND-gate 122 and an inverter 120. The output of the inverter is directed to another AND-gate 121, a second leg of which is controlled by the right signal designated R or RIGHT. Since the MSH signal is high, the output of the inverter 120 will be low and will disable the AND-gate 121. The second leg of the AND-gate 122 is controlled by the left direction signal designated L or LEFT. The output of this AND-gate 122 along with the output of the AND-gate 121 is directed to an OR-gate 123. These logic components permit a left shift only for certain of the information bits if the section is the most significant half and permits a right shift only to the same information bits for the least significant half section.

The output of the OR-gate 123 is directed to two AND-gates 124 and 128 controlled by a true and an inverted N1 shift by four selection signal respectively. The output of both AND-gates 124 and 128 is directed to the shift by four unit 21. Another AND-gate 125 in the shift selection unit 20 is controlled by the right and $\overline{N1}$ signals. The output of this AND-gate 125 is also directed to selected AND-gates in the shift by four unit 21. Yet another AND-gate 129 in the shift selection unit 20 is controlled by the true N1 and left signals. The output of this AND-gate 129 is directed to selected AND-gates in the shift by four unit 21. The shift by two selection signal N2 is directed to an inverter 126. Both the true N2 signal and its inverted signal $\overline{N2}$ is directed to the shift by two unit 22. The shift by 1 selection signal N3 is also directed to an inverter 130 and both the N3 and $\overline{N3}$ signals are directed to the shift by one section of the multiplexer 18, see FIG. 4.

The number of logic gates in each of the shifting units and the control of each logic gate of the shifting units by the shift selection unit 20 can be obtained by referring to a copending application Ser. No. 329,805, filing date Feb. 5, 1973, filed by the same inventor as the present invention and entitled "IMPROVED POSITION SCALER FOR COMPUTER ARITHMETIC UNIT," which application is assigned to the same assignee as the present application. Details of the shift section can be obtained by referring to the aforementioned copending application. The position scaler according to the ALU/SHIFTER of the present invention is basically two 4 bit shifters combined through selective actuation of the shift selection unit 20.

Thus the shift by four unit 21 comprises a plurality of AND-gates 140–153, 14 in number, and a plurality of OR-gates 154–160, 7 in number. The shift by two unit 22 comprises a plurality of AND-gates 161–170, 10 in number, and a plurality of OR-gates 171–175, 5 in number. The outputs from the shift by two unit 22 are directed to the register shift output section for storage before presenting the signals to the multiplexer 18. The register shift output unit permits the use of a common data bus to direct the signals to the shift unit and then to transmit the shift resultant back via the multiplexer 18 to the data bus. The register shift output thus comprises five flip-flops 176–181 whose outputs S1–S5 are shown directed to eight AND-gates 104–111 of the multiplexer 18, see FIG. 4. For a better understanding of the shift section an operation will be discussed using the logic components shown on FIG. 5, the multiplexer 18 shown on FIG. 4, and the truth table shown on FIG. 6.

For the operation to be first discussed, a shift right of two will be assumed to have been requested by the instruction decode. A right shift is in the direction from the most significant digit, the B1 bit information signal, to the least significant digit, the B8 bit information signal. Referring first to the truth table of FIG. 6, for a shift right of two positions, R2 in the operation column, the right signal has been enabled, R = 1, the left signal is disabled, L = 1, the N1 and N3 shift selection signals are disabled, N1 and N3 = 0, $\overline{N1}$ and $\overline{N3}$ = 1, and the N2 shift selection is enabled for the two position shift, N2 = 1 and $\overline{N2}$ = 0. Thus for a right two, R2, the B1 and B2 signals will be low since no information bits can be shifted right into these positions. This is shown by the dash in the B1 and B2 columns for a R2 shift. The B1 input information bit should be eventually positioned in the B3 information bit position on the output. Referring to FIG. 5, the only AND-gate in the shift selection unit 20 that is enabled is the AND-gate 125 controlled by the right and $\overline{N1}$ signals. The output of the AND-gate 125 is directed to the AND-gates 141, 143, 145 and 147 in the shift by four unit 21. As stated previously the bit information signals B1–B8 directed to this half of the ALU/SHIFTER unit is shown first on the group of AND-gates in the shift by four unit 21. The numbers shown in parenthesis immediately after the bit information signals refer to the bit information signal that is directed to the second ALU/SHIFTER, the least significant half section. Since an 8 bit shifter is the preferred embodiment, both halves should be checked.

The B1 bit information signal from the bus is directed to AND-gate 147. The second leg of the AND-gate 147 is enabled by the AND-gate 125. The output of the AND-gate 147 is directed to the OR-gate 157. The output of the OR-gate 157 is directed to two AND-gates 164 and 167 in the shift by two unit 22. The AND-gate 167 is disabled by the low $\overline{N2}$ signal. The AND-gate 164 is activated by the high N2 signal and the high signal from the OR-gate 157. The output of the AND-gate 164 is directed to the OR-gate 172. The output of the OR-gate 172 is directed to the S2 flip-flop 177. Thus at the occurrence of the master clock signal CLM, the flip-flop 177 will be enabled, thereby enabling the S2 signal.

The S2 signal is directed to the AND-gates 109 and 110 in the multiplexer 18 unit shown in FIG. 4. The shift by one selection signal is disabled and thus the $\overline{N3}$ signal is high. Thus the AND-gate 109 is enabled and the AND-gate 110 is disabled. The AND-gate 109 has its output directed to the OR-gate 114. Upon the enabling of the allow output AOUT signal, the AND-gate 118 will be enabled to direct the information from OR-gate 114 to the B3 bit information signal on the data bus line. Enabling a right shift signal with a shift by two causes the B1 information signal to be transferred to the B3 bit position.

Referring again to FIG. 5, the B1 information bit signal is directed to an AND-gate 146' (not shown) and a shift by four unit 21 in the least significant half section of the ALU/SHIFTER corresponding to the AND-gate 146. The B1 information bit signal is shown by the 1 placed in parenthesis after the B5 information signal directed to the AND-gate 146. The corresponding AND-gate 146' will not be enabled because the N1 signal is low disabling an AND-gate 124' in the least significant half shift selection unit 20 corresponding to the AND-gate 124. This logical path would be enabled in the event that the B1 information bit would be shifted right more than four positions, thereby causing the B1 bit information signal to be positioned in the B5–B8 or least significant half output positions.

The shift left is performed in a similar manner as the shift right except that the shift is performed in the opposite direction, from the least significant digit B8 towards the most significant digit B1. For a shift left requirement, the right or R signal is low, R = 0, the left or L signal is enabled, L = 1, and the shift selection signals, N1, N2 and N3 are enabled selectively according to the truth table shown in FIG. 6. Thus for a shift left of two, referring to FIG. 6, for an L2 operation the N1 and N2 signals are high, N1 and N2 = 1, $\overline{N1}$ and $\overline{N2}$ = 0, and the N3 shift selection signal is low, N3 = 0, $\overline{N3}$ = 1. Using the truth table and the logic as shown in FIG. 3, a left shift can be followed through the separate units.

A somewhat different operation is performed in the circular mode as shown in the truth table of FIG. 6. For instance, if a two shifts in the right direction and six shifts in the left direction is performed in the circular mode, the information bit signals eventually end in the same position as if done separately. Thus in FIG. 6, these operations are shown on the same line. In the circular mode, following the operation of a right two or left six R2L6 operation, the right signal R is high, R=1, the left signal L is high, L = 1, the N1 and N3 shift signals are disabled, N1 and N3 = 0, $\overline{N1}$ and $\overline{N3}$ = 1, and the N2 shift signal is high, N2 = 1, $\overline{N2}$ = 0. The B7 information bit signal on the input should, according to the truth table, become the B1 bit information signal at the output.

Referring to the logic diagram of FIG. 5, the B7 signal is directed to two AND-gates in the shift by four unit 21, the AND-gates 142 and 148. Since the N1 signal is low, the AND-gates 124 will be disabled which in turn will disable the AND-gate 142. The AND-gate 128 is enabled by the $\overline{N1}$ signal and the output from the OR-gate 123. The OR-gate 123 is enabled by the AND-gate 122 since the unit being discussed is the most significant half and the MSH signal is high along with the left signal. The AND-gate 148 is enabled and its output is directed to the AND-gate 168 in the shift by two unit 22 via the OR-gate 158. The second leg of the AND-gate 168 is enabled by the high N2 signal. The output of the AND-gate 168 is directed to the OR-gate 174 and via the OR-gate 174 to the flip-flop 179 in the register shift output. The flip-flop 179 will be enabled by the concurrence of the CLM clock signal and the high signal from the OR-gate 174.

The S4 signal is directed to the AND-gates 105 and 106 in the multiplexer 18 on FIG. 4. The AND-gate 106 is disabled by the low N3 signal. The AND-gate 105 is enabled by the high $\overline{N3}$ signal. The output of the AND-gate 105 is directed to the OR-gate 112. The output of the OR-gate 112 enables one leg of the AND-gate 116. Thus the multiplexer 18 will transmit the signal on the output of the OR-gate 112 to the data bus as the B1 signal when the allow output AOUT signal is enabled. The B7 input bit information signal becomes the B1 output bit information signal as shown in the truth table of FIG. 6.

Checking the corresponding gates for the least significant half section, the B7 bit information signal is directed to corresponding AND-gate 143' and the corresponding AND-gate 149' in the shift by four unit 21 of the least significant half section. The corresponding AND-gate 149' is disabled by the low N1 signal applied to the corresponding AND-gate 129' in the shift selection unit 20 of the least significant half section. The corresponding AND-gate 143' will be enabled by the enabled corresponding AND-gate 125'. The corresponding AND-gate 143' is directed to a corresponding OR-gate 155' whose output in turn is directed to a corresponding AND-gate 163' in the shift by two unit 22 in the least significant half section. The other leg of the corresponding AND-gate 163' is disabled by the low $\overline{N2}$ signal and thus no other output can occur via the B7 signal applied to the least significant half section of the ALU/SHIFTER.

Thus what has been shown and described is an arithmetic, logical and position scaler device which can perform operations on eight information bits by using two identical circuits each handling 4 bits of information. The output data is directed to the same data bus from which the input data is obtained. Particular logic configuration is used to control the full adders to obtain a decrease in the logic components required. Also by designating one of the 4 bit information units the most significant half section and by the use of particular logic components in the shift selection unit 20 in the position scaler portion, identical logic circuitry can be used for the position scaler section in both the least significant half section, bit information signals B5–B8, and the most significant half section, bit information signals B1–B4.

Also the register shift output 23 may be placed after a separate shift by one unit. The register shift output 23 would then comprise an 8 bit storage means directly connected to the data bus 10 or having a separate gating for the allow output AOUT signal to release the information to the data bus. The use of the multiplexer unit 18 as a shift by one unit permits the decrease in logic gates as previously stated.

While the principles of the invention have now been made clear in an illustrated embodiment, there will be immediately obvious to those skilled in the art many modifications of structure, arrangement, proportion, the elements, materials and components, used in the practice of the invention, and otherwise, which are particularly adapted for specific environments and operating requirements without departing from these principles. The appended claims are, therefore, intended to cover and embrace any such modifications, with limits only of the true spirit and scope of the invention.

I claim:

1. In a data processing system having a data bus for receiving and transmitting sets of data information bit signals, and instruction means for generating arithmetic commands, shift commands and instruction signals, an arithmetic logic system comprising:

arithmetic selection means for receiving the arithmetic commands and for generating arithmetic function signals in response thereto;

input storage means connected to said data bus to receive a set of data information bit signals for storing the received data information bit signals as one of the arithmetic operands upon actuation of an allow input instruction signal from the instruction means;

arithmetic gating means connected to said arithmetic selection means for receiving arithmetic function signals;

a plurality of full adder units, one for each data information bit signals in a set, connected to said arithmetic gating means;

output storage means connected to said plurality of full adder units for storing a second arithmetic operand comprising a set of data information bit signals and for storing the resultant of the arithmetic and logic operations;

carry look ahead means connected to said arithmetic gating means for gating an overflow signal in the event the arithmetic operation results in an excess information bit over the number in a set of data information bit signals, said carry look ahead means generating said excess information bit signal when requested by an instruction signal requesting the carry information from the instruction means;

said input and output storage means addressing said arithmetic gating means, wherein said arithmetic gating means operates in response to the arithmetic commands to perform arithmetic and logic functions on the data information bit signals in said input and output storage means in cooperation with said plurality of full adder units, the resultant from said plurality of full adder units being directed to said output storage means for storage therein; and means connected to said output storage means and receiving an instruction signal from said instruction means for gating the resultant set of data information bit signals to said data bus.

2. An arithmetic logic system as defined in claim 1 further including a shift section for shifting position of a set of information bit signals, either right or left with blank information fill, said shift section comprising:

a shift selection means for receiving the shift commands and for generating shift direction signals designating the right or the left shift of information bit signals and for generating shift selection signals, and responsive thereto to generate first shift signals comprising the concurrent activation of the shift direction signals with a true and inverted highest shift selection signal, and subsequent shift signals comprising the remaining shift selection signals and an inverted counterpart of each shift selection signal;

a plurality of shift selection units including a highest shift selection unit and one or more lower shift selection units, with the lowest to the highest shift selection units each progressively shifting an incrementally higher power of two from a zero power up to and including a power of two which, when combined, gives a number of shifts to place the most significant information bit signal into the least significant bit position and vice versa, the data information bit signals from the shift selection units being directed, in turn, from the highest shift selection unit to the lowest shift selection unit;

said highest shift selection unit connected to receive a set of data information signals from said data bus and said first shift signals from said shift selection means, for shifting the received data information signals the number of positions required by said highest shift selection unit;

said lower shift selection units shifting in one direction only and connected to said shift selection unit to receive shift selection signals for activation of the shift selection unit to shift the data information bit signals the positions required according to the unit; and a third storage means connected to said lowest shift unit for receiving and storing the shifted data information bit signals and for transmitting said stored data information bit signals to said data bus.

3. A shift section as defined in claim 2 wherein both left and right shift direction signals are activated to form a circular shift thereby placing the lesser significant digits into more significant positions and vice versa without loss of data information bit signals.

4. A shift section as defined in claim 2 wherein the number of information bit signals shifted are equal to eight, said plurality of shift selection units are equal in number to three, the highest shift selection unit shifts the information bits four places and the lower shift selection unit shifts the information bit signals two and one places respectively.

5. An arithmetic logic system as defined in claim 1 wherein said means connected to said output storage means is a multiplexer unit performing a shift by one scaler function on a set of data information bit signals.

6. An arithmetic logic system as defined in claim 5 further including a shift section for shifting position of a set of information bit signals, either right or left with blank information fill, said shift section comprising:

a shift selection means for receiving the shift commands and for generating shift direction signals designating the right or the left shift of information bit signals and shift selection signals, and responsive thereto to generate first shift signals comprising the concurrent activation of the shift direction signals with a true and inverted highest shift selection signal, and subsequent shift signals comprising the remaining shift selection signals and an inverted counterpart of each shift selection signal;

a plurality of shift selection units including a highest shift selection unit and one or more lower shift selection units, with the lowest to the highest shift selection units each progressively shifting an incrementally higher power of two from a zero power up to and including a power of two which, when combined, gives a number of shifts to place the most significant information bit signal into the least significant bit position and vice versa, the data information bit signals from the shift selection units being directed, in turn, from the highest shift selection unit to the lowest shift selection unit, the lowest or shift by one selection unit being performed by said multiplexer unit;

said highest shift selection unit connected to receive a set of data information signals from said data bus and said first shift signals from said shift selection means, for shifting the received data information signals the number of positions required by said highest shift selection unit;

said lower shift selection units, including said multiplexer unit, shifting in one direction only and connected to said shift selection unit to receive shift selection signals for activation of the shift selection unit to shift the data information bit signals the positions required according to the unit; and a third storage means connected between the next lowest shift selection unit and the shift by one selection unit of the multiplexer for receiving and storing the shifted data information bit signals and for transmitting the shifted data information bit signals to said multiplexer for shifting therein, if required, said multiplexer transmitting the fully shifted data information bit signals to said data bus when activated.

7. An arithmetic logic system connected to a data bus for receiving and transmitting sets of data information bit signals from and to the data bus, and receiving arithmetic commands, shift commands and instruction signals from an instruction generating means, said arithmetic logic system comprising:

arithmetic selection means for receiving the arithmetic commands and for generating arithmetic function signals in response thereto;

input storage means connected to said data bus to receive a set of data information bit signals for storing the received data information bit signals as one of the arithmetic and logical operands upon activation of an allow input instruction signal from the instruction generating means;

arithmetic gating means connected to said arithmetic selection means for receiving arithmetic function signals;

a plurality of full adder units, one for each data information bit signal in a set, connected to said arithmetic gating means;

output storage means connected to said plurality of full adder units for storing a second arithmetic operand comprising a set of data information bit signals and for storing the resultant of the arithmetic and logic operations;

said input and output storage means addressing said arithmetic gating means, wherein said arithmetic gating means operates in response to the arithmetic commands to perform arithmetic and logic functions on the data information bit signals in said input and output storage means in cooperation with said plurality of full adder units, the resultant from said plurality of full adder units being directed to said output storage means for storage therein; and means connected to said output storage means and receiving an instruction signal from the instruction generating means for gating the resultant set of data information bit signals to said data bus.

8. An arithmetic logic system as defined in claim 7 further including carry look ahead means connected to said arithmetic gating means for gating an overflow signal in the event the arithmetic operation results in an excess information bit over the number in a set of data information bit signals, said carry look ahead means generating said excess information bit signal when requested by an instruction signal requesting the carry information from the instruction means.

9. An arithmetic logic system as defined in claim 7 further including a shift section for shifting position of a set of information bit signals, either right or left with blank information fill, or in a circular mode without loss of data information bit signals.

10. An arithmetic logic system as defined in claim 9 wherein said shift section comprises:

a shift selection means for receiving the shift commands and for generating shift direction signals designating the right or the left shift of information bit signals and shift selection signals, and responsive thereto to generate first shift signals comprising the concurrent activation of the shift direction signals with a true and inverted highest shift selection signal, and subsequent shift signals comprising the remaining shift selection signals and an inverted counterpart of each shift selection signal;

a plurality of shift selection units including a highest shift selection unit and one or more lower shift selection units, with the lowest to the highest shift selection units each progressively shifting an incrementally higher power of two from a zero power up to and including a power of two which, when combined, gives a number of shifts to place the most significant information bit signal into the least significant bit position and vice versa, the data information bit signals from the shift selection units being directed, in turn, from the highest shift selection unit to the lowest shift selection unit;

said highest shift selection unit connected to receive a set of data information signals from said data bus and said first shift signals from said shift selection means, for shifting the received data information signals the number of positions required by said highest shift selection unit;

said lower shift selection units shifting in one direction only and connected to said shift selection unit to receive shift selection signals for activation of the shift selection unit to shift the data information bit signals the positions required according to the unit; and a third storage means connected to said lowest shift unit for receiving and storing the shifted data information bit signals and for transmitting said stored data information bit signals to said data bus.

11. An arithmetic logic system as defined in claim 7 wherein said means connected to said output storage means is a mutiplexer unit performing a shift by one scaler function on a set of data information bit signals.

12. An arithmetic logic system as defined in claim 11 further including a shift section for shifting position of a set of information bit signals, either right or left with blank information fill, said shift selection comprising:

a shift selection means for receiving the shift commands and for generating shift direction signals designating the right or the left shift of information bit signals and shift selection signals, and responsive thereto to generate first shift signals comprising the concurrent activation of the shift direction signals with a true and inverted highest shift selection signal, and subsequent shift signals comprising the remaining shift selection signals and an inverted counterpart of each shift selection signal;

a plurality of shift selection units including a highest shift selection unit and one or more lower shift selection units, with the lowest to the highest shift selection units each progressively shifting an incrementally higher power of two from a zero power up to and including a power of two which, when combined, gives a number of shifts to place the most significant information bit signal into the least significant bit position and vice versa, the data information bit signals from the shift selection units being directed, in turn, from the highest shift selection unit to the lowest shift selection unit, the lowest or shift by one selection unit being performed by said multiplexer unit;

said highest shift selection unit connected to receive a set of data information signals from said data bus and said first shift signals from said shift selection means, for shifting the received data information signals the number of positions required by said highest shift selection unit;

said lower shift selection units, including said multiplexer unit, shifting in one direction only and connected to said shift selection unit to receive shift selection signals for activation of the shift selection unit to shift the data information bit signals the positions required according to the unit; and a third storage means connected between the next lowest shift selection unit and the shift by one selection unit of the multiplexer for receiving and storing the shifted data information bit signals and for transmitting the shifted data information bit signals to said multiplexer for shifting therein, if required, said multiplexer transmitting the fully shifted data information bit signals to said data bus when activated.

13. An arithmetic logic system connected to a data bus for receiving and transmitting sets of data information bit signals from and to the data bus, and receiving arithmetic commands, shift commands and instruction signals from an instruction generating means, said arithmetic logic system comprising:

arithmetic selection means for receiving the arithmetic commands and for generating arithmetic function signals in response thereto;

input storage means connected to said data bus to receive a set of data information bit signals for storing the received data information bit signals as one of the arithmetic and logical operands upon activation of an allow input instruction signal from the instruction generating means;

arithmetic gating means connected to said arithmetic selection means for receiving arithmetic function signals;

a plurality of full adder units, one for each data information bit signal in a set, connected to said arithmetic gating means;

output storage means connected to said plurality of full adder units for storing a second arithmetic operand comprising a set of data information bit signals and for storing the resultant of the arithmetic and logic operations;

said input and output storage means addressing said arithmetic gating means, wherein said arithmetic gating means operates in response to the arithmetic commands to perform arithmetic and logic functions on the data information bit signals in said input and output storage means in cooperation with said plurality of full adder units, the resultant from said plurality of full adder units being directed to said output storage means for storage therein;

a multiplexer unit connected to said output storage means and receiving an instruction signal from said instruction generating means for gating the resultant set of data information bit signals to said data bus; and a shift section controlled by the shift commands for shifting position of a set of information bit signals, either right or left with blank information fill, or in a circular mode without loss of data information bit signals, said multiplexer unit further receiving shifted data information bit signals from said shift section for performing a shift by one scaler function under control of the shift commands for said shift section.

14. An arithmetic logic system as defined in claim 13 further including carry look ahead means connected to said arithmetic gating means for gating an overflow signal in the event the arithmetic operation results in an excess information bit over the number in a set of data information bit signals, said carry look ahead means generating said excess information bit signal when requested by an instruction signal requesting the carry information from the instruction means.

15. A system for performing arithmetic, logical and shifting manipulations on a set of data information bit signals received from a data bus for transmission to the same data bus after performing the manipulations according to arithmetic commands, shift commands and instruction signals from an instruction generating means, said system including two identical arithmetic logic systems interconnected such that each transmits a different one-half of the set of data information bit signals to the data bus, each of said arithmetic logic systems comprising:

arithmetic selection means for receiving the arithmetic commands and for generating arithmetic function signals in response thereto;

input storage means connected to said data bus to receive one-half of a set of data information bit signals for storing the received data information bit signals as one of the arithmetic and logical operands upon activation of an allow input instruction signal from the instruction generating means;

arithmetic gating means connected to said arithmetic selection means for receiving arithmetic function signals;

a plurality of full adder units, one for each data information bit signal in one-half of a set, connected to said arithmetic gating means;

output storage means connected to said plurality of full adder units for storing a second arithmetic operand comprising a one-half set of data information bit signals and for storing the resultant of the arithmetic and logical operations;

carry look ahead means connected to said arithmetic gating means for gating an overflow signal in the event the arithmetic operation results in an excess information bit over the number in one-half of a set of data information bit signals, said overflow signal being the carry out signal from the system if the arithmetic logic system handles the most significant digits of the set and a carry in signal to the other arithmetic logic system if the arithmetic logic system handles the lesser significant digit of the set;

a multiplexer unit connected to said output storage means and receiving an instruction signal from the instruction generating means for gating the resultant one-half set of data information bit signals to said data bus; and a shift section for shifting position of a one-half set of information bit signals, either right or left with blank information fill, or in a circular mode without loss of data information bit signals, said shift section comprising;

a shift selection means for receiving the shift commands and for generating shift direction signals designating the right or the left shift of information bit signals and shift selection signals, and responsive thereto to generate first shift signals comprising the concurrent activation of the shift direction signals with a true and inverted highest shift selection signal, and subsequent shift signals comprising the remaining shift selection signals and an inverted counterpart of each shift selection signal, selectively combined with a signal designating the arithmetic logic system supplying the most significant one-half of the set of data information bit signals to the data bus to permit a left shift only for certain of the information bit signals for the most significant half section and a right shift only to the same information bits for the other half section;

a plurality of shift selection units including a highest shift selection unit and one or more lower shift selection units, with the lowest to the highest shift selection units each progressively shifting an incrementally higher power of two from a zero power up to and including a power of two which, when combined, gives a number of shifts to place the most significant information bit signal into the least significant bit position and vice versa, the data information bit signals from the shift selection units being directed, in turn, from the highest shift selection unit to the lowest shift selection unit, the lowest or shift by one selection unit operations being performed by said multiplexer unit;

said highest shift selection unit connected to receive a set of data information signals from said data bus and said first shift signals from said shift selection means, for shifting the received data information signals the number of positions required by said highest shift selection unit;

said lower shift selection units, including said multiplexer unit, shifting in one direction only and connected to said shift selection unit to receive shift selection signals for activation of the shift section unit to shift the data information bit signals the positions required according to the unit; and a third storage means connected between said multiplexer unit and the next lowest shift selection unit for receiving and storing the shifted data information bit signals and for transmitting the shifted data information bit signals to said multiplexer for shifting therein, if required, said multiplexer transmitting the fully shifted one-half set of data information bit signals to said data bus when activated.

* * * * *